Jan. 30, 1962 R. W. HARRUFF ET AL 3,018,947

PORTABLE RECORD SENSING APPARATUS

Filed Sept. 1, 1959 3 Sheets-Sheet 1

Inventors
Ray W. Harruff
William S. Touchman
By their Attorney
Vincent A. White

Jan. 30, 1962 R. W. HARRUFF ET AL 3,018,947

PORTABLE RECORD SENSING APPARATUS

Filed Sept. 1, 1959 3 Sheets-Sheet 3

United States Patent Office
3,018,947
Patented Jan. 30, 1962

3,018,947
PORTABLE RECORD SENSING APPARATUS

Ray W. Harruff, Xenia, and William S. Touchman, Cedarville, Ohio, assignors to A. Kimball Company, Brooklyn, N.Y., a corporation of New York Filed Sept. 1, 1959, Ser. No. 837,521
4 Claims. (Cl. 234—30)

This invention relates to apparatus for sensing data bearing records. More particularly the invention relates to a portable device for sensing data indications on a record and for punching or otherwise certifying that the record has been sensed.

As disclosed in an application for United States Letters Patent Serial No. 706,044, filed December 30, 1957, in the names of John E. Clemens et al., now Patent No. 2,980,-319, issued April 18, 1961, there is provided a hand-held device for sensing perforated tags. This device also has provision for punching a certification that the tag has been read. This certification in the form of a punched hole serves as a visual reminder that the tag must not be again sensed for the same purpose, such for example, as in inventory taking. However, it is impractical for an operator to pay close attention sufficient to be aware of the presence or absence of a certification hole when processing large numbers of tags.

Accordingly, it is a general object of the invention to provide apparatus for automatically sensing certification and for controlling the sensing of the data on the tag according to the presence or absence of such certification. To this end a plurality of certification punches are mounted in the sensing unit and are selected by adjustment of a single interposer over the punches. The interposer is resiliently mounted for movement with a plurality of sensing pins which sense the perforated data encoded in the tag. Due to the resilient mounting the interposer has limited movement relative to the pins before the selected punch is forced through the tag. A switch bar associated with a pair of contacts is mounted for movement with the interposer. The bar is so arranged that prior to the limited movement of the interposer the bar is spaced from the contacts which form a part of a control circuit for effecting reading of data sensed from the tag. The limited movement of the interposer before punching is sufficient to engage the bar with the contact plates to effect closure of the reading control circuit. However, in the event that the tag has been previously sensed and a certification hole already exists in the tag then the interposer will not be moved in its limited movement and the contact bar will not be closed with the contact plates thus preventing closure of the reading control circuit.

The above and other features of the invention together with various novel details of constructions will now be described with reference to the drawings and thereafter pointed out in the claims.

FG. 4 is an illustration of a typical perforated record tag; and

FG. 5 is a section of the device in enlarged scale showing the casing and a portion of the frame broken away.

Figure 4:
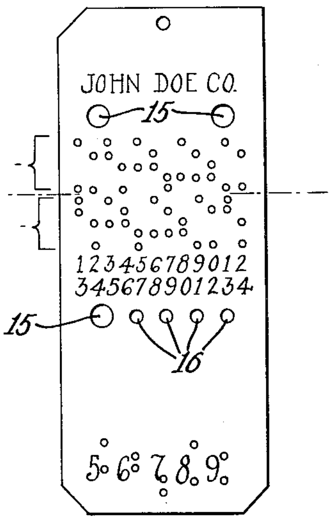

FIG. 4 illustrates a type of perforated tag generally used in merchandising and is provided with a plurality of columns of index point positions for coding data thereon. The tag is provided with locating holes 15 which accurately position the tag in the hand-held sensing device. Adjacent the lower locating hole there is provided on the tag, space for the punching of four possible certification holes 16 all of which are shown as having been punched. As illustrated, certification holes 16 indicate that the tag has been previously sensed. The certification hole positions, it may be assumed, could be punched while processing the tag, for example, for taking inventory or as it relates to an article returned by a customer or for reorder purposes.

Figure 1:
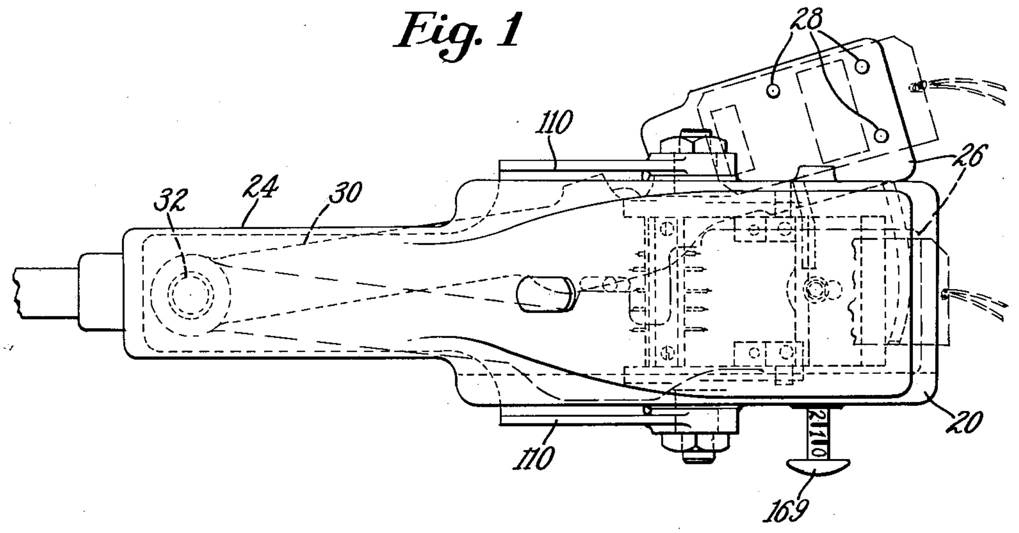
FIG. 1 is a plan view of a hand-held sensing device in which the invention is embodied.
Figure 2:
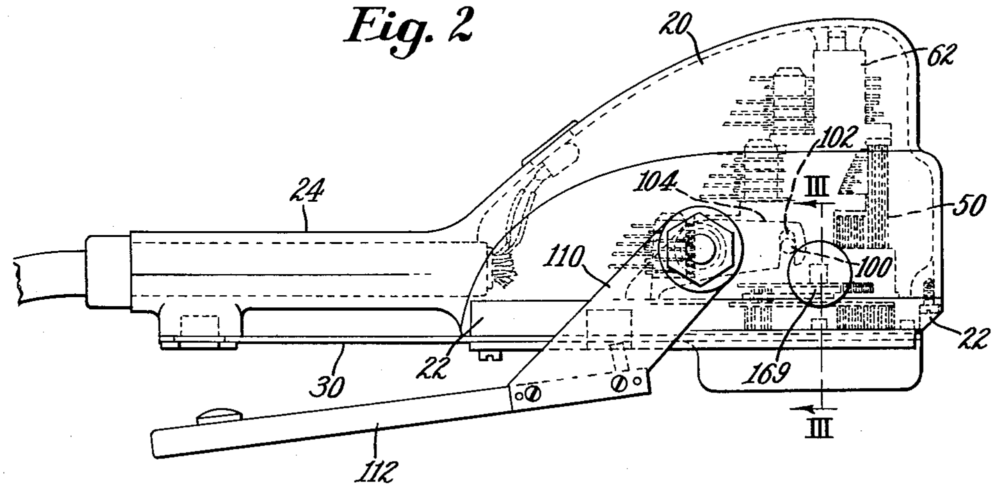
FIG. 2 is a side elevation of the sensing device.

The hand-held device for reading the data indicative perforations in a record such as in the above-mentioned tags is illustrated generally in FIGS. 1 and 2. As illustrated, the device is provided with a casing 20 which encloses and isolates the mechanical and electrical elements of the hereinafter described sensing instrumentalities as well as the certification punching and sensing. The casing has secured to its lower and open side a base member 22 so that the casing and base member form an enclosure to exclude extraneous material from the sensing elements. For convenient handling by an operator the casing is provided with a handle 24. For positioning and locating a tag relative to the sensing instrumentalities to be described, the device is provided with a swingable tray 26 having locating pins 28 adapted to receive the locating holes 15 in the record tag. So that the tag may be easily placed on the tray 26, the tray may be moved to an exposed loading position as illustrated in FIG. 1, the sensing position of the tray being indicated in dash lines. The tray 26 is formed on one end of an arm 30 which is mounted for swinging movements on a headed stud 32 fixed in the handle 24, so that the tray may be swung from the tag loading position to the tag reading position where the data indicative perforations of the tag are accurately alined with the sensing instrumentalities of the device. For insuring that the tray positions the tag to be read in accurate register, the sensing instrumentalities are inoperative unless the tray is in its reading position.

Figure 5:
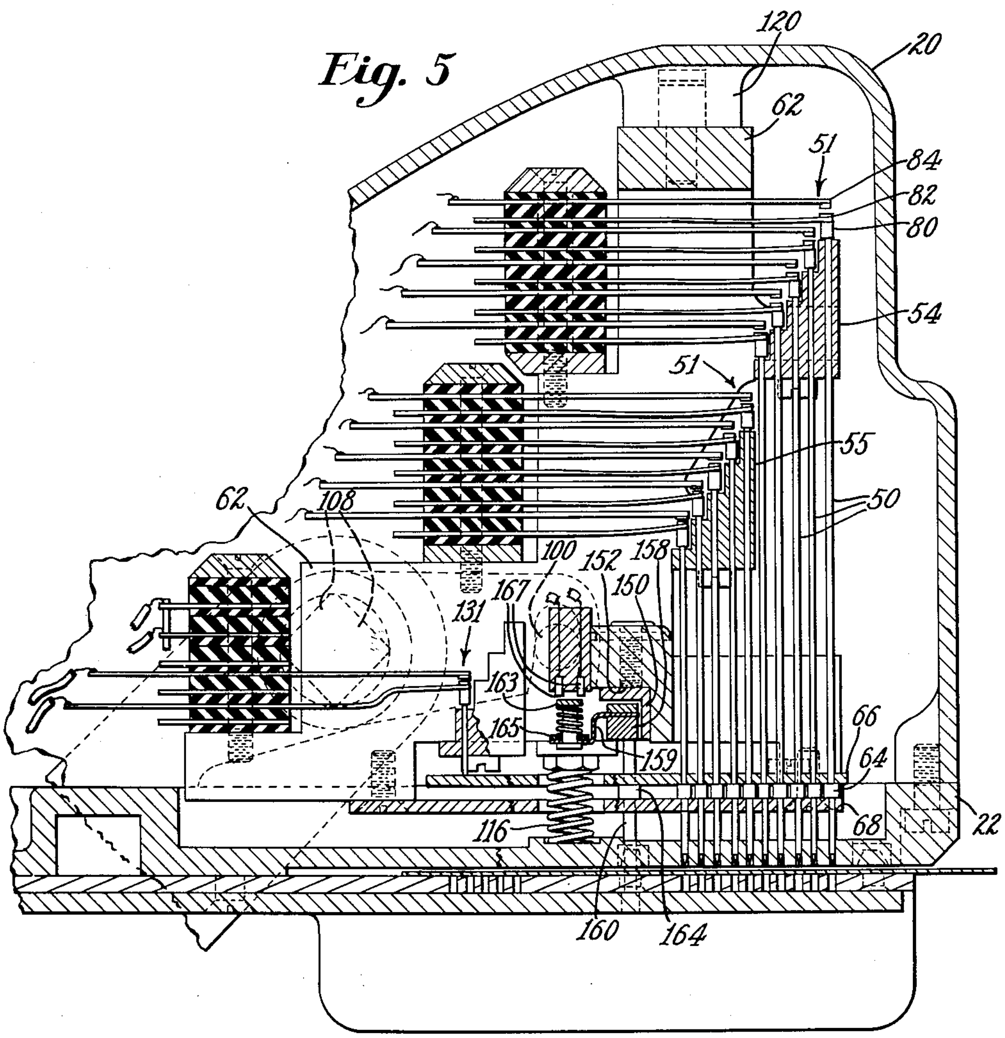

For sensing the data indicative perforations in a tag resting on the tray, the sensing device is provided with a plurality of spaced sensing pins 50 and associated sensing contacts 51 (FIG. 5) arranged in rows and columns corresponding to the rows and columns of all possible perforations in the record tags. The sensing pins at their lower ends are slidably mounted in spaced bores in the base member 22. The upper ends of the pins are mounted for sliding movements in blocks 54 and 55 which are secured to a U-shaped frame 62. Adjacent their lower ends, the pins are each provided with a portion 64 of enlarged diameter which fits between two plates 66 and 68. The plates 66, 68 are provided with holes which allow the pins, excepting the enlarged portions 64, to pass freely through the plates. The plate 66 engages the upper side of the portions 64 of the pins and is secured to the base member 22. The plate 68 engages the lower sides of the portions 64 and is secured to the underside of the frame 62. The upper ends of the sensing pins are provided with heads 80 of insulating material adapted to rest against the underside of individual lower spring contacts 82 of the contacts 51. Each lower spring contact has associated therewith an upper leaf contact 84, the contacts being biased in open positions when the frame 62 and the sensing pins are in their upper retracted positions as indicated in FIG. 5.

For moving the frame 62 and hence also the sensing pins 50 downwardly as a unit to sense the data indicative holes in a tag resting on the tray 26, the frame 62 is provided at opposite sides with two pins 100 adapted to be received in slots 102 of a pair of arms 104 which have cylindrical portions bearing in and extending outwardly through the sides of the casing 20. The outer ends of the cylindrical portions have four flats 108 (FIG. 5) adapted to be received in mating square holes in two arms 110 of a movable handle 112. For maintaining the frame 62 in its upper and non-sensing position, and by means of the plate 68 also maintaining the sensing pins in their upper retracted positions, a pair of compression springs 116 (FIG. 5) at their lower ends bear against the base member 22, and at their upper ends rest against guide screws threaded into the underside of the frame 62. The frame 62 is thus biased to its upper position with its upper side against a boss 120 in the casing. Thus, it may be seen that by squeezing the two handles 24 and 112 together, the arms 104 are moved down until the pins 100 are engaged by the upper ends of the slots 102 in the arms. Upon further movement of the arms 104, the frame 62 is moved down against the action of the springs 116, thus also moving the sensing pins 50 downwardly to sense the tag. Since a two out of five bit code is utilized on the tag, at least two pins 50 in each column pass through perforations in the tag resting on the tray 26 while three of the pins in each column are stopped or displaced relative to the frame 62 by unperforated portions of the tag as illustrated in FIG. 5. In this manner the lower spring contacts 82 associated with the displaced sensing pins are caused to close with their associated upper contacts 84 which continue to move downwardly with the frame 62. The foregoing is fully covered in the above-noted application Serial No. 706,044 and reference may be had thereto for more detailed discussion.

To perforate the tag as a certification that the tag has been sensed, a gag bar 150 (FIGS. 3 and 5) is slidably mounted in a slot 152 provided therefor in the frame 62, one end of the bar passing through a clearance hole 154 in the casing 20. To retain the bar in the slot and to form a lower bearing surface for the bar, a retaining strap 156 is secured to the underside of the frame. The bar 150 is provided with a gag lug 158 mounted within a clearance slot 157 in the bar, the lug being adapted to engage selectively the upper end of one of four punches 160 which are guided at their lower ends by bores 162 in the base member 22. The gag lug is carried at one end of a spring plate 159 which at its opposite and is fixed to the bar by rivets 161. Referring to FIG. 5, it may be seen that the plate 159 adjacent the gag lug is provided with an offset tab which carries a spring pressed contact bar 163. The bar is electrically isolated from the plate 159 by an insulating pad 165. The bar 163 is arranged to engage a pair of contacts 167 which in series with a pair of contacts 131 form part of a circuit for initiating the operation of electrical control circuits fully described in the above-noted application Serial No. 706,044. The contacts 131 are closed simultaneously with sensing of the tag in a manner and for a purpose fully disclosed in the above application, the contacts 131 being identified therein by the same reference character. Such control circuits, as disclosed therein, cause the sensed data indications to be read and analyzed. As seen in FIG. 5, the contact bar is normally spaced from the contacts 167 to maintain the control circuits in open condition prior to the sensing of a tag.

Figure 3:
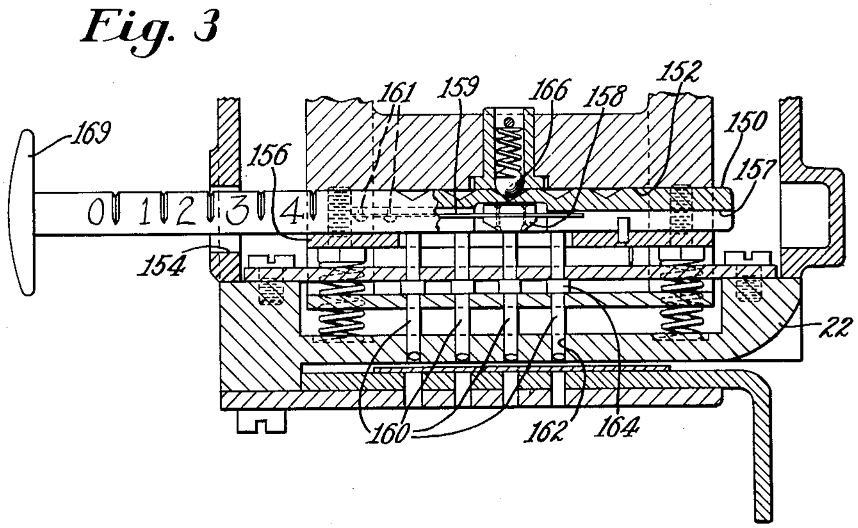
FIG. 3 is a section in enlarged scale on line III—III of FIG. 2.

The punches 160 are provided with enlarged portions 164 which fit between the plates 66 and 68 in the same manner as do the enlarged portions 64 of the sensing pins 50. With the exception of the enlarged portions, the punches pass freely through the plates 66 and 68. The tray 26 is also provided with holes alined with the punches to accommodate the material which is punched from the tag. The gag bar 150 is provided at its left end, as seen in FIG. 3, with a knob 169 and with indicia which indicate to the operator which punch is engaged by the gag lug 158. By sliding the bar 150 lengthwise in the slot 152, the operator may gag any one of the punches 160 at will as indicated by which of the indicia numerals is alined with the side of the casing 20. To ensure that the gag lug 158 is alined properly with any selected punch, the upper surface of the bar 150 is provided with spaced depressions each adapted to receive a spring pressed ball 166 when the lug is properly positioned over a punch.

It should be apparent that when the handles 24 and 112 are squeezed together by the operator causing the sensing pins to sense the perforations in a tag, the downward movement of the frame 62 carrying with it the gag bar 150 also will cause only one of the punches 160 to be forced through the tag resting on the tray. The remaining punches are stopped by the tag surface and are not forced downwardly through the tag due to the clearance slot 159 adjacent the lug 158 in the gag bar above these punches. During the upward movement of the frame 62 when the handles are released by the operator the plate 68 engages the lower surfaces of the enlarged portions 64 of the sensing pins 50 and the portions 164 of the punches raising the punches and the sensing pins from the tag to their initial positions as indicated in FIG. 5.

When the selected punch engages the surface of the tag, the spring plate 159 yields causing the contact bar 163 to engage and close with the contacts 167. In this manner the sensing control circuit is closed when the tag is punched to render the sensing of the tag effective to control the operation of a secondary device as fully disclosed in the above application Serial No. 706,044. It should be apparent from the foregoing that if the tag has been previously sensed and punched in the selected certification position, then the selected punch will pass freely through the previously punched certification hole without causing the plate 159 to yield. In this event the contact 167 will not be closed by the bar 163 and the reading control circuit remains open rendering the sensing contacts ineffective to read data indications in the tag.

Having thus described our invention, what we claim as novel and desire to secure by Letters Patent of the United States is:

1. In a record sensing device, means for sensing data indications on a record presented to said device, means for impressing said record with a certification indication while the record is being sensed, and means controlled by the impressing means for causing the sensed data indications to be analyzed in the event of impression of the certification indication.

2. In a record sensing device, means for sensing data indications on a record presented to said device, means for impressing said record with a certification indication while the record is being sensed, said impressing means also being effective to sense the presence of a previously impressed certification indication, and means controlled by the impressing means for causing the sensed data indications to be analyzed if the impressing means impresses a certification indication and for preventing analyzing of the sensed data indications if the impressing means senses a previously impressed certification indication.

3. In a record sensing device, a support for a record to be sensed, means for sensing data indications on a record on the support, a punch for punching a certification hole in said record, punch actuating means, a frame mounting the sensing means and resiliently mounting the punch actuating means for limited movement relatively to the frame, spaced electrical contacts fixed to the frame, said contacts forming part of a control circuit for reading data indications sensed, means carried by said actuating means for closing the contacts, said closing means being normally spaced from the contacts whereby the contacts are normally open, and means for moving the frame relative to the support for causing the sensing means to sense the record and the punch to be arrested by the tag moving the actuating means relative to the frame for closing the contacts.

4. In a record sensing device, a support for a record to be sensed, means for sensing data indications on a record on the support, a punch for punching a certification hole in said record, said punch being adapted to pass freely through a previously punched certification hole if present, punch actuating means, a frame mounting the sensing means and resiliently mounting the punch actuating means for limited movement relative to the frame, spaced electrical contacts fixed to the frame, said contacts forming part of a control circuit for reading data indications sensed, means carried by said actuating means for closing the contacts, said closing means being normally spaced from the contacts whereby the contacts are normally open, and means for moving the frame relative to the support for causing the sensing means to sense the record and the punch to move into the plane of the record whereby if the punch is arrested by the record the actuating means is moved relative to the frame to close the contacts and whereby if a certification hole exists in the tag then the punch passes freely through said hole without causing the contacts to be closed.

References Cited in the file of this patent

UNITED STATES PATENTS

| | | |
|---|---|---|
| 2,577,070 | Cheney | Dec. 4, 1951 |
| 2,647,580 | Connolly | Aug. 4, 1953 |
| 2,798,668 | Watkin | July 9, 1957 |
| 2,857,788 | Huhn | Oct. 28, 1958 |